United States Patent
Tao et al.

(10) Patent No.: US 8,315,768 B2
(45) Date of Patent: Nov. 20, 2012

(54) ACCELERATOR PEDAL PREDICTIVE SHIFT POINT CONTROL

(75) Inventors: Xuefeng Tim Tao, Northville, MI (US); Bradley J. Lemmen, Howell, MI (US); Scott R. Verna, Dexter, MI (US); John E. Marano, Milford, MI (US); James L. Lanzon, Fenton, MI (US)

(73) Assignee: GM Global Technology Operations LLC

( * ) Notice: Subject to any disclaimer, the term of this patent is extended or adjusted under 35 U.S.C. 154(b) by 853 days.

(21) Appl. No.: 12/388,945

(22) Filed: Feb. 19, 2009

(65) Prior Publication Data
US 2009/0210122 A1 Aug. 20, 2009

(51) Int. Cl.
*G06F 7/00* (2006.01)

(52) U.S. Cl. .......................................................... 701/55

(58) Field of Classification Search .................... 701/51, 701/54, 62; 477/3, 79, 166; 307/10.5
See application file for complete search history.

(56) References Cited

U.S. PATENT DOCUMENTS

| | | | | |
|---|---|---|---|---|
| 5,425,686 | A * | 6/1995 | Grange | 477/79 |
| 5,751,073 | A * | 5/1998 | Ross | 307/10.5 |
| 6,039,674 | A * | 3/2000 | Dourra et al. | 477/166 |
| 6,076,414 | A | 6/2000 | Tabata et al. | |
| 7,500,470 | B2 | 3/2009 | Buslepp et al. | |
| 7,654,248 | B2 | 2/2010 | Buslepp et al. | |
| 7,726,281 | B2 | 6/2010 | Buslepp et al. | |
| 8,108,112 | B2 | 1/2012 | Thor | |
| 8,133,154 | B2 | 3/2012 | Tao et al. | |
| 2006/0155453 | A1* | 7/2006 | Han et al. | 701/54 |
| 2006/0293822 | A1* | 12/2006 | Lattemann et al. | 701/51 |
| 2008/0032855 | A1* | 2/2008 | Sah et al. | 477/3 |
| 2008/0071449 | A1* | 3/2008 | Kondo et al. | 701/51 |
| 2008/0125946 | A1* | 5/2008 | Fakler et al. | 701/62 |

* cited by examiner

*Primary Examiner* — James Trammell
*Assistant Examiner* — Sanjeev Malhotra

(57) ABSTRACT

A transmission control module for a vehicle transmission includes a gear determination module, a predictive shift module, and a validation module. The gear determination module commands a first shift configuration based on an actual pedal position. The predictive shift module calculates a predicted pedal position based on the actual pedal position and commands a second shift configuration based on the predicted pedal position. The validation module validates the predicted pedal position and selectively cancels the second shift configuration based on the validation.

10 Claims, 4 Drawing Sheets

ACCELERATOR PEDAL PREDICTIVE SHIFT POINT CONTROL

CROSS-REFERENCE TO RELATED APPLICATIONS

This application claims the benefit of U.S. Provisional Application No. 61/029,596, filed on Feb. 19, 2008. The disclosure of the above application is incorporated herein by reference in its entirety.

FIELD

The present disclosure relates to control of an automatic transmission and more particularly to an accelerator pedal predictive shift point control for improved downshift response and downshift type consistency.

BACKGROUND

The statements in this section merely provide background information related to the present disclosure and may not constitute prior art.

Motorized vehicles traditionally include a power supply (e.g. an internal combustion engine, an electric motor and/or a combination thereof) that produces a drive torque. A transmission receives the drive torque and employs various gear ratios to modify the input drive torque to obtain a desired output torque for the wheels.

One or more control modules regulate operation of the power supply and transmission to achieve this desired output torque. For example, an engine control module may regulate a throttle controlling air entering the internal combustion engine, while a transmission control module may regulate the various gear ratios transmitting the output drive torque. Additionally, the functions of the engine and transmission control modules may be incorporated into a single powertrain control module. The control module(s) may receive direction from a driver interface device, such as an accelerator pedal. As the accelerator pedal position is changed, the control module(s) select operating conditions to achieve a specific gear ratio corresponding to the requisite output torque. The specific gear ratio is obtained from a lookup table of current throttle versus vehicle speed.

In operation, a driver may require a rapid switch between specific gear ratios. This normally occurs when the transmission downshifts due to driver requested rapid acceleration (e.g. when passing another vehicle). Switching between gear ratios can occur as a stacked single-step multiple downshift (e.g. a first shift from 6-5 followed by a second shift from 5-4), a jump downshift (e.g. 6-4), or a skip downshift (e.g. 6-3). In the stacked single-step multiple downshift, an inability to abort an on-going first downshift causes a delay in initiating the second downshift. The driver may perceive this as poor downshift response or an undesirable second shift event. Further, since the downshift types are commonly determined relative to the pedal position as a function of time, rather than using an accelerator pedal position rate of change and/or an accelerator pedal velocity rate of change, the driver may also perceive inconsistent downshift types under low, medium, and high tip-in maneuvers (e.g. depression of the accelerator pedal).

SUMMARY

A transmission control module for a vehicle transmission includes a gear determination module, a predictive shift module, and a validation module. The gear determination module commands a first shift configuration based on an actual pedal position. The predictive shift module calculates a predicted pedal position based on the actual pedal position and commands a second shift configuration based on the predicted pedal position. The validation module validates the predicted pedal position and selectively cancels the second shift configuration based on the validation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
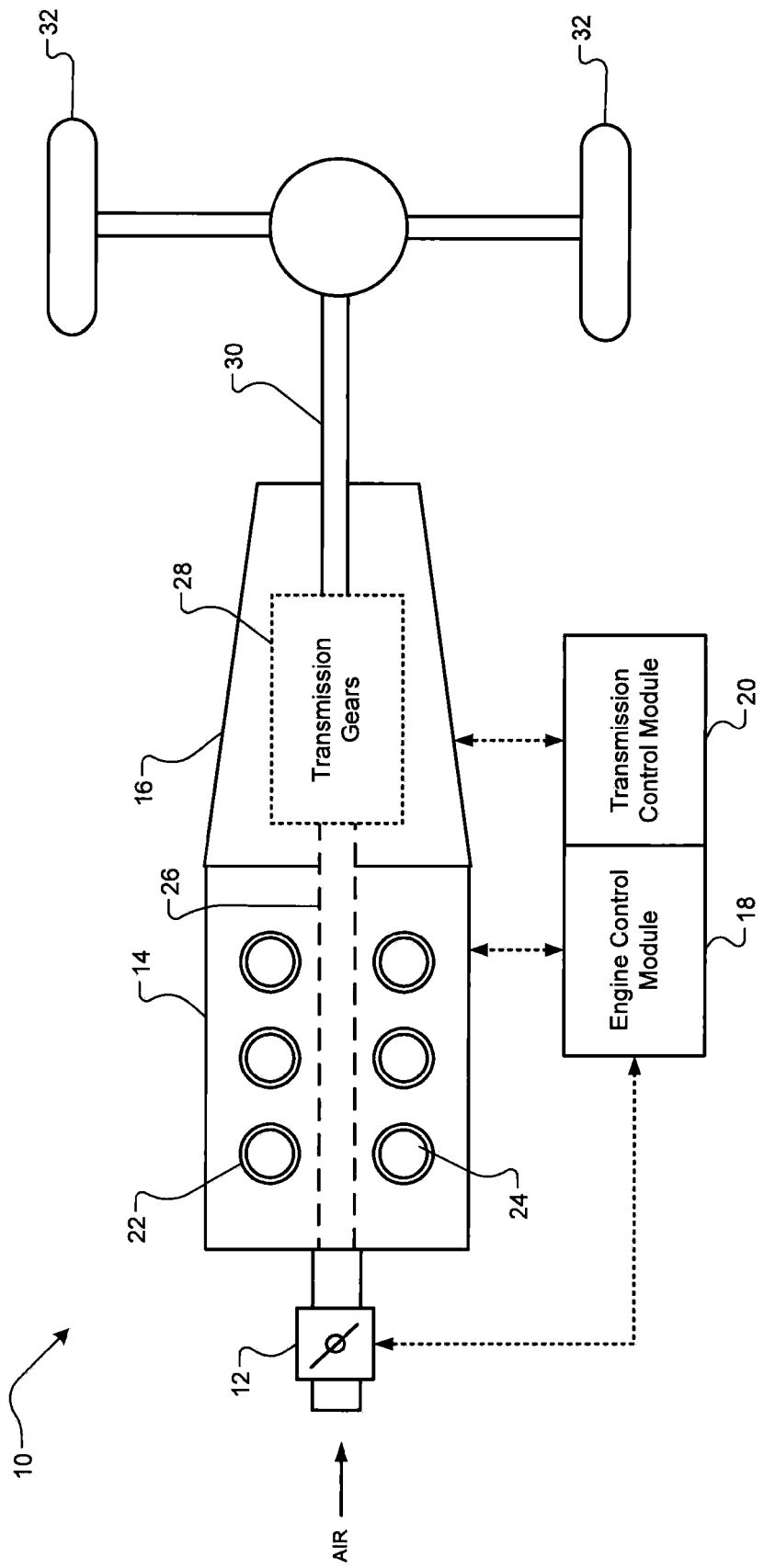
FIG. 1 is a functional block diagram illustrating a vehicle drive system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle drive system 10 is shown. The vehicle drive system 10 includes a throttle valve 12, an engine 14, an automatic transmission 16, an engine control module (ECM) 18, and a transmission control module (TCM) 20. Air enters the vehicle drive system 10 through the throttle valve 12. The throttle valve 12, under direction from the ECM 18, regulates the amount of air flowing into the engine 14. The air is evenly distributed to N cylinders 22 located in the engine 14. Although FIG. 1 depicts the engine 14 having six cylinders 22 (N=6), it should be understood that the engine 14 may include additional or fewer cylinders 22. For example, the engine 14 may include 4, 5, 6, 8, 10, 12 or 16 cylinders. The functions of the separate ECM 18 and TCM 20 could also be combined in a single powertrain control module (PCM).

The air entering the engine 14 combusts with fuel, reciprocally driving pistons 24 located within the cylinders 22. The reciprocating pistons 24 rotatably drive a crankshaft 26, which provides a drive torque to the transmission 16. The transmission 16 translates the drive torque through a series of gears 28 utilizing a plurality of gear ratios (e.g. 3-speed, 4-speed, 5-speed, 6-speed, etc.) to an output driveshaft 30. The driveshaft 30 then distributes the drive torque to vehicle wheels 32. Specifically, the transmission 16 may include a plurality of solenoid-actuated hydraulic valves (not shown) that shift the transmission 16 between the various gear ratios. For example, a combination of two or three electro-hydraulic solenoids shuttle the hydraulic valves to achieve a fixed gear state corresponding to each of the gear ratios. The TCM 20 manages the shifting pattern of the solenoid-actuated hydraulic valves based on a commanded gear ratio when information relayed from various vehicle sensors indicates the need for an increase or decrease in vehicle acceleration.

Figure 2:
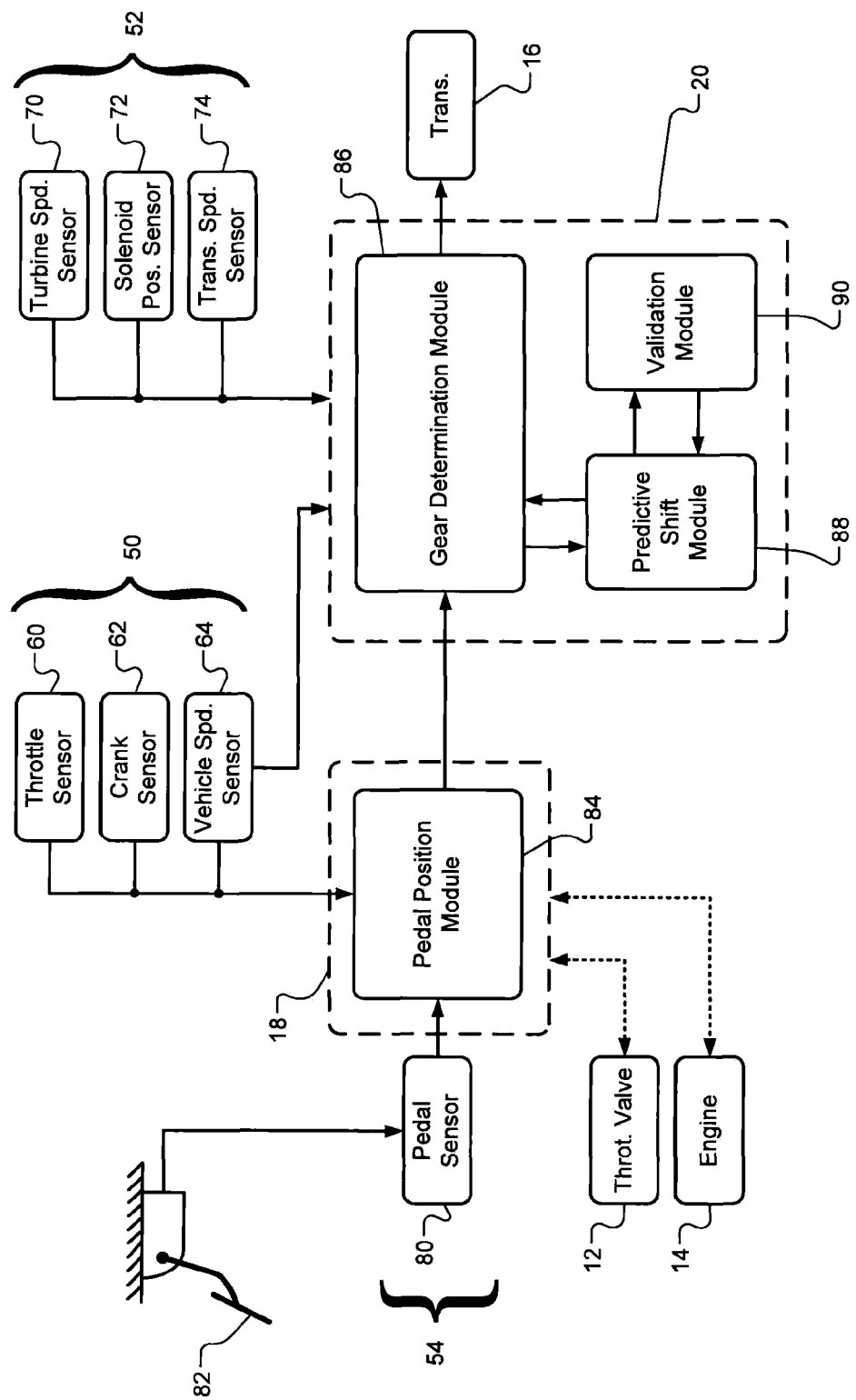
FIG. 2 is a schematic diagram illustrating an engine control module and a transmission control module of the vehicle drive system according to the present disclosure.

Referring now to FIG. 2, the various vehicle sensors may include engine sensors 50, transmission sensors 52, and driver interface sensors 54. The engine sensors 50 may include, but are not limited to, a throttle sensor 60 that monitors current position and operation of the throttle valve 12; a crank sensor 62 that monitors the position and rotational speed of the crankshaft 26; and a vehicle speed sensor 64 that monitors the rate at which the crankshaft 26 is spinning. The ECM 18 uses information received from the engine sensors 50 to manage parameters, such as fuel injection timing and ignition timing, to obtain desired drive torque values. In some instances, the ECM 18 controls the position of the throttle valve 12, creating a feedback loop between the throttle valve 12 and the ECM 18.

Typical transmission sensors 52 may include, but are not limited to, a turbine speed sensor 70 that monitors rotational speed on the input side of the transmission 16; one or more solenoid position sensors 72 that monitor the position of the solenoid actuated hydraulic shift valves; and a transmission speed sensor 74 that monitors the rotational speed of the driveshaft 30. It should be understood that the solenoid position sensors 72 may, instead, be pressure switches for indirect monitoring of the shifting valves.

The information relayed to the TCM 20 from the transmission sensors 52 assists the TCM 20 in determining the current operating conditions of the transmission 16, such as, whether the transmission 16 is shifting between two ranges. This information, in conjunction with data obtained from the vehicle speed sensor 64, is then used to calculate how and when to change the gears 28 to achieve optimum vehicle performance, fuel economy and shift quality at the desired drive torque value.

Driver interface sensors 54, such as a pedal sensor 80 associated with an accelerator pedal 82, also provide signals to the ECM 18. For example, the pedal sensor 80 may signal a change in position of the accelerator pedal 82, which indicates a driver's need for increased vehicle speed during driving maneuvers (e.g. passing another vehicle). The ECM 18 interprets this request and may adjust the throttle valve 12 to regulate airflow into the engine 14. The ECM 18 also provides feedback to the TCM 20, which in turn, generates instructions to downshift the transmission gear ratio from current parameters to obtain the desired output torque. The output torque ultimately transmits to the vehicle wheels 32, affecting the desired acceleration.

The ECM 18 includes a pedal position module 84, which receives data from the throttle sensor 60, the crank sensor 62, the vehicle speed sensor 64, and the pedal sensor 80. The pedal position module 84 interprets the driver intent based on information received from these signals and calculates accelerator effective position (AEP). The AEP calculation may then be transmitted from the ECM 18 to the TCM 20 via a serial datalink (e.g. CAN).

The TCM 20 includes a gear determination module 86, a predictive shift module 88, and a validation module 90. The gear determination module 86 receives the AEP from the ECM 18, along with inputs from the turbine speed sensor 70, the one or more solenoid position sensors 72, the transmission speed sensor 74, and the vehicle speed sensor 64. The gear determination module 86 may then use the AEP to calculate AEP velocity (i.e. the rate at which the accelerator pedal 82 changes position) and AEP acceleration (i.e. the rate at which the accelerator pedal 82 changes velocity). These AEP calculations may be used to determine and command an appropriate gear ratio.

The TCM 20 also determines whether to initiate the predictive shift module 88 based on various factors. For example, the predictive shift module 88 is not active at all times during vehicle operation. Under certain operating conditions, such as when the throttle valve 12 experiences a fault or when accelerator pedal maneuvering is at steady state, the TCM 20 bypasses the predictive shift module 88 and allows the gear ratio from the gear determination module 86 to execute without modification. However, when the predictive shift module 88 is activated, the gear ratio from the gear determination module 86 may be modified.

The predictive shift module 88 receives inputs from the gear determination module 86 and the vehicle speed sensor 64. For example, the predictive shift module 88 uses the calculated AEP rate and AEP acceleration to determine a predicted AEP (P-AEP). The predictive shift module 88 then uses the P-AEP, along with inputs from the turbine speed sensor 70, the one or more solenoid position sensors 72, the transmission speed sensor 74, and the vehicle speed sensor 64, to command an alternate P-AEP gear ratio in lieu of the previously commanded AEP gear ratio.

When a downshift is triggered as a result of using the predictive shift module 88, the P-AEP is stored in the validation module 90 and a prediction timer is initiated. The validation module 90 monitors and stores the highest attained AEP during a predetermined time period corresponding to an abort shift time. The abort shift time is the amount of time available to cancel a currently commanded downshift and execute an alternate command.

Figure 5:
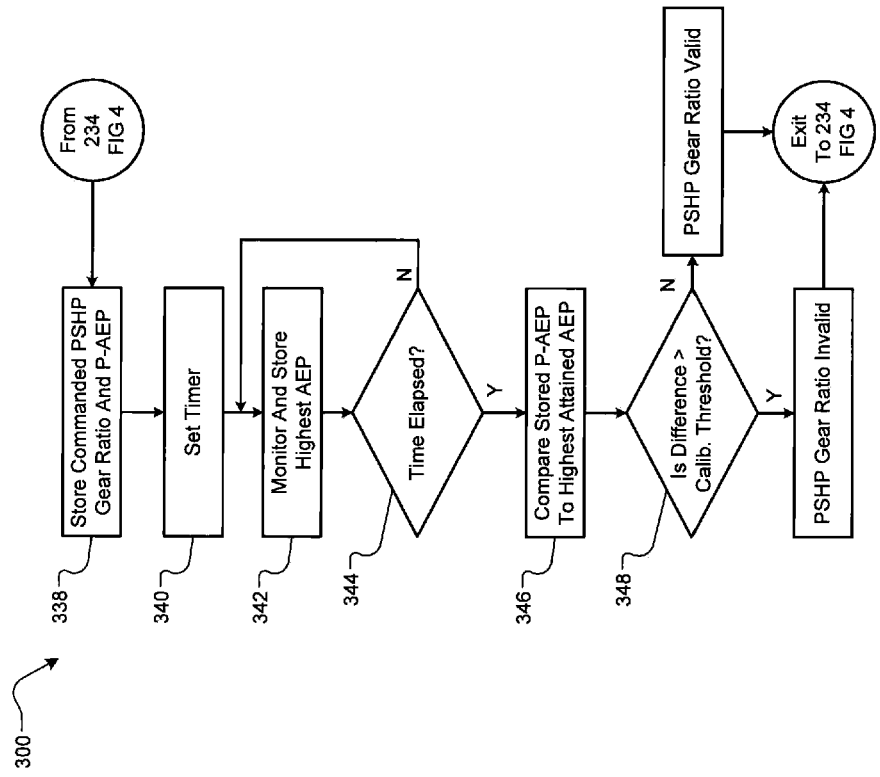
FIG. 5 is a flow diagram of a validation operation of the PSHP of FIG. 4.
Figure 3:
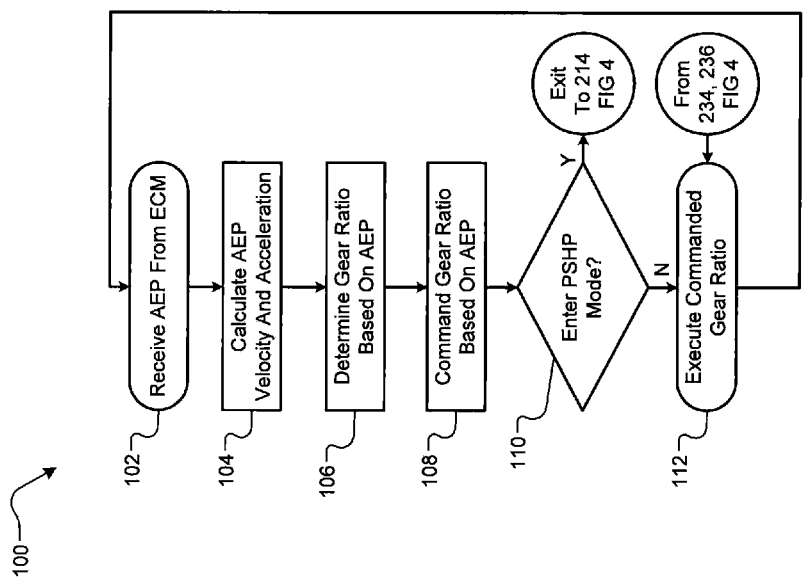
FIG. 3 is a flow diagram of a shift point control method incorporating a Predictive Shift Point Control Mode (PSHP) according to the present disclosure.
Figure 4:
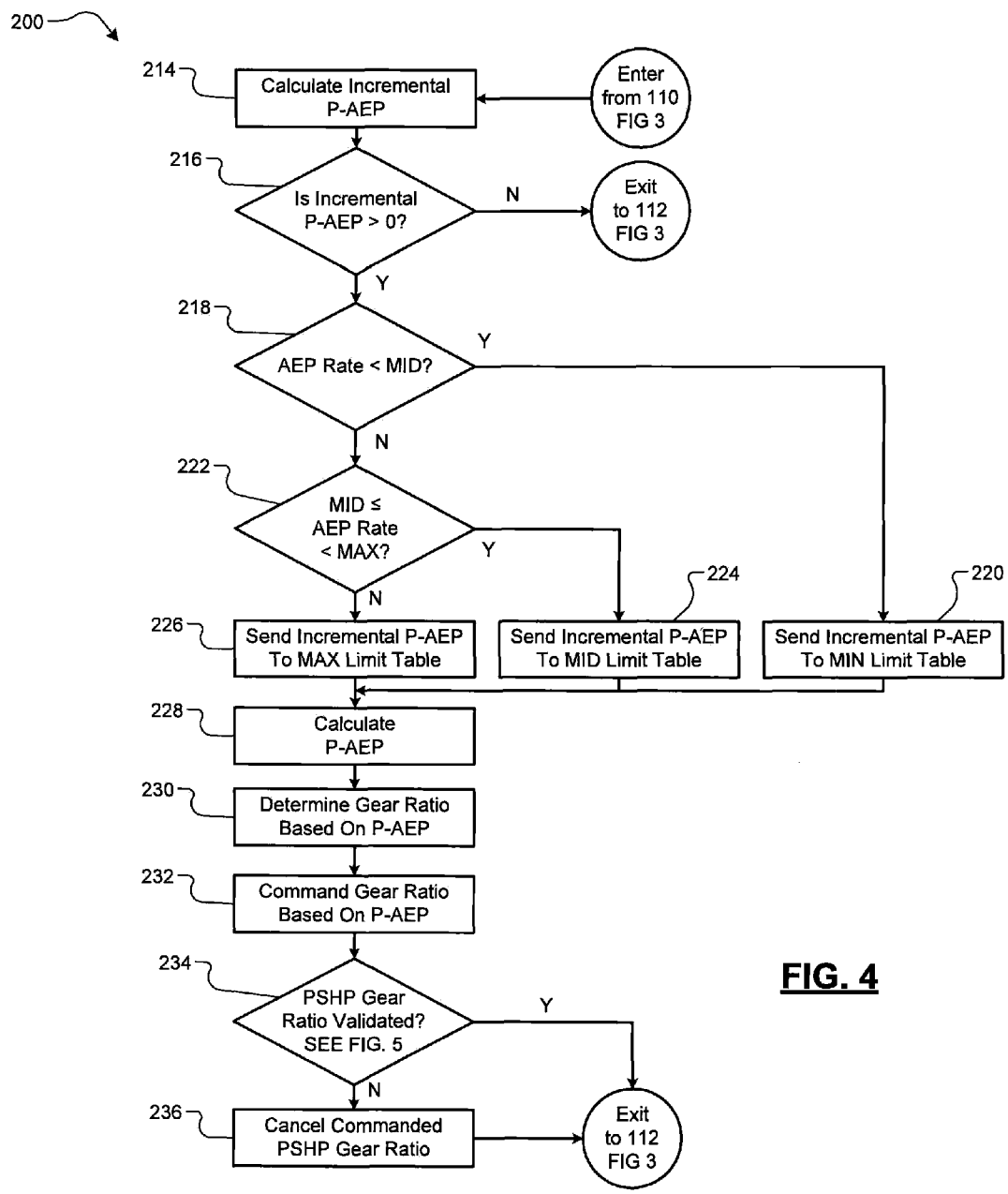
FIG. 4 is a flow diagram of the PSHP initiated in FIG. 3 according to the present disclosure.

Referring now to FIG. 3, a shift point control method 100 will be described in detail. The shift point control method 100 calculates the AEP rate of change (velocity) and acceleration, commands the appropriate gear ratio based on the AEP, and determines whether a Predictive Shift Point Control Mode (PSHP) 200 (as shown in FIG. 4) should be entered. If the shift point control method 100 determines that the PSHP 200 should be entered, then a validation operation 300 (as shown in FIG. 5) validates the P-AEP and corrects for any overprediction. This validation occurs within the corresponding downshift abort time window, thereby preventing the execution of unwanted downshifts. The shift point control method 100 then executes the appropriate gear ratio based on one of AEP or P-AEP.

The shift point control method 100 starts when the gear determination module 86 receives the calculated AEP from the pedal position module 84 in step 102. The gear determination module 86 calculates the AEP velocity and acceleration in step 104. An appropriate gear ratio corresponding to the AEP calculations and inputs from the turbine speed sensor 70, the one or more solenoid position sensors 72, the transmission speed sensor 74, and the vehicle speed sensor 64, is then determined by looking to a shift map in step 106. The gear determination module 86 then commands the selected gear ratio in step 108.

The shift point control method 100 next determines whether initiation of the predictive shift module 88 should occur in step 110. The predictive shift module 88 is only active during certain driving maneuvers. When initiated, the predictive shift module 88 follows a Predictive Shift Point Control Mode (PSHP) 200 (FIG. 4) that increases downshift availability and improves the consistency in downshift types. When the shift point control method 100 bypasses the PSHP 200 (i.e. step 110 is evaluated as "NO"), the commanded gear ratio executes in step 112. For example, entrance criteria for the PSHP 200 may include: 1) no active throttle faults; 2) inactive PSHP 200; 3) AEP velocity above an entry threshold; 4) previous commanded downshift status; 5) previously active shift delay status; and 6) previously active gear override status.

Referring now to FIG. 4, when the shift point control method 100 meets all the necessary entrance criteria (i.e. step 110 is evaluated as "YES"), the predictive shift module 88 initiates and the PSHP 200 begins. However, the PSHP 200 may exit at any time if any of the following exit criteria are satisfied: 1) active PSHP 200; 2) a throttle fault occurs; 3) accelerator pedal maneuvering is deemed to be a steady state; 4) AEP is decreased below an exit threshold; 5) currently active shift delay status; or 6) currently active gear override status.

In one example, the incremental P-AEP is calculated in step 214. The incremental P-AEP is the product of a defined calibratable gain as a function of AEP velocity, a defined modifier as a function of AEP acceleration, and the amount of time in the future for which the P-AEP shall be computed as a function of the current commanded gear. The incremental P-AEP is limited to a positive value in step 216 to ensure that the prediction only applies to increasing throttle maneuvers. If the incremental P-AEP is not a positive value, the PSHP 200 may exit to step 112 of the shift point control method 100.

If the incremental P-AEP is a positive value, beginning in step 218 three defined regions for the P-AEP characteristics are determined so that the downshift events are proportional to the driver's intended accelerator pedal tip-in maneuver. Each region is defined based on the AEP rate and includes a low range (MIN), a medium range (MID), and a high range (MAX). For example only, a hysteresis method may be used to determine the thresholds of the regions to avoid oscillation among the regions due to noise found in the AEP signal.

When the AEP rate is in the low range (i.e. less than MID), the incremental P-AEP is confined to a MIN limit table in step 220. For example, the MIN limit table may only permit the scheduling of single-step downshifts. If the AEP rate is not in the low range, the AEP rate is checked to determine whether it falls in the medium range (i.e. greater than or equal to MID, but less than MAX) in step 222. If the AEP rate is in the medium range, the incremental P-AEP is confined to a MID limit table in step 224. For example, the MID limit table may force the scheduling of jump downshifts. Otherwise, the AEP rate falls in the high range and the incremental P-AEP is confined to a MAX limit table in step 226. For example, the MAX limit table may force the scheduling of skip downshifts.

In step 228, the limited, incremental P-AEP is added to the AEP to obtain the P-AEP. The predictive shift module 88 determines an appropriate gear ratio corresponding to the calculated P-AEP in step 230 and commands the selected gear ratio in step 232.

When a downshift is triggered as a result of the PSHP 200, the gear ratio determined from the calculated P-AEP is validated in step 234 as will be described further below. If the PSHP gear ratio is validated, the PSHP gear ratio remains as the commanded gear ratio. The PSHP 200 then exits to step 112 of the shift point control method 100 where the commanded gear ratio is executed by the gear determination module 86. Conversely, if the PSHP gear ratio is determined to be invalid, the PSHP 200 continues to step 236 where the commanded PSHP gear ratio is cancelled. After cancelling the commanded PSHP gear ratio, the PSHP 200 exits to step 112 of the shift point control method 100 where the AEP gear ratio is executed by the gear determination module 86.

Referring now to FIG. 5, the PSHP gear ratio validation operation 300 will be described in greater detail. In step 338, the commanded PSHP gear ratio and associated P-AEP from step 230 are sent to the validation module 90 and stored for further evaluation. A prediction timer, located in the validation module 90, is set in step 340. In step 342, the validation operation 300 monitors and stores the highest AEP achieved during a prediction time calculated to be slightly less than the abort shift time. Until the prediction time has elapsed in step 344, the validation operation 300 continues to monitor and store the highest AEP.

When the prediction time has elapsed, the validation operation 300 compares the stored P-AEP to the highest value of the AEP attained during the prediction time in step 346. If the difference between the P-AEP and the highest value of the AEP reached during the prediction time is less than a calibration threshold, as determined in step 348, the PSHP gear ratio is considered to be valid. Conversely, if the difference between the P-AEP and the highest value of the AEP reached during the prediction time is greater than the calibration threshold, the PSHP gear ratio is considered to be invalid. The validity or invalidity of the PSHP gear ratio is output to step 234 of the PSHP 200. As the validation operation 300 takes place within the abort shift time window, any corrections take place before unwanted downshifts are actually executed.

This description is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A transmission control module for a vehicle transmission, the module comprising:
    a gear determination module that commands a first shift configuration based on an actual pedal position;
    a predictive shift module that calculates a predicted pedal position based on said actual pedal position and commands a second shift configuration based on said predicted pedal position; and
    a validation module that validates said predicted pedal position and selectively cancels said second shift configuration based on said validation.

2. The module of claim 1 wherein said actual pedal position is calculated in a pedal position module based on input from a vehicle sensor.

3. The module of claim 2 wherein said vehicle sensor is at least one of a throttle sensor, a crank sensor, a vehicle speed sensor, and a pedal sensor.

4. The module of claim 2 wherein said actual pedal position is calculated based on at least one of an accelerator pedal position, an accelerator pedal velocity, and an accelerator pedal acceleration.

5. The module of claim 1 wherein the transmission control module bypasses said predictive shift module and executes said commanded first shift configuration.

6. The module of claim 1 wherein the transmission control module executes said commanded second shift configuration.

7. The module of claim 1 wherein said gear determination module determines said first shift configuration based on input from a vehicle sensor.

8. The module of claim 7 wherein said vehicle sensor is at least one of a turbine speed sensor, a solenoid position sensor, a transmission speed sensor, and a vehicle speed sensor.

9. The module of claim 1 wherein said predictive shift module determines said second shift configuration based on input from a vehicle sensor.

10. The module of claim 9 wherein said vehicle sensor is at least one of a turbine speed sensor, a solenoid position sensor, a transmission speed sensor, and a vehicle speed sensor.

* * * * *